United States Patent [19]
Herbeck

[11] Patent Number: 5,374,128
[45] Date of Patent: Dec. 20, 1994

[54] LINEAR BALL SLIDE

[75] Inventor: Lionel E. Herbeck, Rochester, N.Y.

[73] Assignee: Automation Gages, Inc., Rochester, N.Y.

[21] Appl. No.: 207,205

[22] Filed: Mar. 8, 1994

[51] Int. Cl.⁵ .......................................... F16C 29/12
[52] U.S. Cl. ......................................... 384/49; 384/57
[58] Field of Search ................... 384/49, 57, 39, 40, 384/501

[56] References Cited

U.S. PATENT DOCUMENTS

| | | | |
|---|---|---|---|
| 2,343,575 | 3/1944 | Penney | 384/49 |
| 2,672,378 | 3/1954 | McVey | 384/49 |
| 3,052,503 | 9/1962 | Pasinski | 384/49 |
| 3,113,807 | 12/1963 | Polidor | 384/49 |
| 3,342,534 | 9/1967 | King | 384/49 |
| 3,790,233 | 2/1974 | Polidor | 384/57 X |
| 4,334,717 | 6/1982 | Polidor | 384/49 |
| 5,106,207 | 4/1992 | Fry | 384/49 |
| 5,201,584 | 4/1993 | Simons | 384/49 |

*Primary Examiner*—Thomas R. Hannon
*Attorney, Agent, or Firm*—Shlesinger, Fitzsimmons & Shlesinger

[57] ABSTRACT

Opposite side of the base section of the slide assembly are supported by two sets of ball bearings for reciprocable movement in an elongate recess formed in the slide section of the assembly. Each set of ball bearings is supported in an elongate retainer plate which extends between a pair of confronting grooves formed in the confronting surfaces of the base and slide sections at each side of the recess. Each set of ball bearings at opposite sides thereof has rolling engagement with a pair of spaced, parallel, longitudinally extending bearing rods that are mounted in each confronting groove. An elongate slot which is formed in the slide section opens at one side thereof on the bottom of one of the grooves in that section, and on the space which separates the pair of bearing rods mounted in that groove. A plurality of screws are adjustably mounted in the slide section to extend transversely across the slot, so that when the screws are adjusted the slot can be closed slightly, thereby reducing slightly the spacing between the associated pair of bearing rods, thus effecting preloading of the bearings.

7 Claims, 1 Drawing Sheet

LINEAR BALL SLIDE

BACKGROUND OF THE INVENTION

This invention is related to antifriction slide assemblies, and more particularly to ball slide assemblies of the linear variety. Even more particularly, this invention relates to novel means for applying the necessary mechanical preload to the bearings of a ball slide of the type described to achieve smooth, shake-free operation of the slide.

There are currently available in the marketplace a variety of ways for preloading cylindrical bearing rods which form the ball races of such slides. U.S. Pat. Nos. 3,113,807 and 4,334,717, for example, disclose the use of elongated, tapered gibs, which are adjustable of the associated slide to effect the necessary preloading of the ball bearing races which are utilized for supporting the slides for longitudinal movement. The U.S. Pat. Nos. 2,672,378 and 3,052,503, on the other hand, teach the use of adjustable bolts for selectively urging one raceway laterally toward the other to effect the desired preloading. While these prior art devices are suitable for effecting the necessary preloading of a linear ball slide, nevertheless it is desirable to provide a ball slide of the type described which utilizes a more compact and inexpensive means for effecting the desired preloading of such slides.

Accordingly, it is an object of this invention to provide an improved ball slide of the type described which eliminates the need for utilizing tapered gibs for effecting the preloading of the associated ball races of the slide.

Still another object of this invention is to provide a linear ball slide having an improved, adjustable preloading means which is extremely simple and inexpensive to manufacture, as compared to preloading means heretofore employed in slides of the type described.

A further object of this invention is to provide for ball slides of the type described an improved adjustable preloading means which can be utilized to perform the dual function of preloading the associated ball bearing races, and producing a differential amount of travel as between the slide and the ball bearing retainers which support the slide for longitudinal movement along the associated base.

Other objects of this invention will be apparent hereinafter from the specification and from a recital of the appended claims, particularly when read in conjunction with the accompanying drawing.

SUMMARY OF THE INVENTION

The slide includes the usual base member, and an inverted, generally U-shaped slide member having a pair of spaced, parallel leg sections supported on opposite sides of the base member by two sets of ball bearings for linear adjustment on the base member. Each set of ball bearings has rolling engagement with two, laterally spaced pairs of elongate bearing rods, one pair of which is seated in a rectangular groove formed in one side of the base member, and the other pair of which is seated in a registering groove formed in of the adjacent leg section of the slide member. One of the leg sections has formed in the bottom of its rectangular groove a rather deep slot extending the length of the slide member, and forming adjacent the bottom of the leg section a lip section which supports one of the two associated bearing rods on its inner end.

For adjustably preloading the bearing races represented by the bearing rods, a plurality of headed screws are mounted in vertical bores in the slide member, with the lower ends of the screws extending through the slot in the one leg section of the slide member, and threading into the lip section of the slotted leg section. By adjusting the screws the lip section can be flexed relative to the remainder of the slide member, thereby reducing the space between the two rods defining one of the ball bearing races, and thus preloading the races.

THE DRAWINGS

FIG. 1 is a plan view of a linear ball slide made according to one embodiment of this invention, portions of the slide being cut away and shown in section for purposes of illustration; and FIG. 2 is a front elevational view of this slide, again with portions thereof cut away and shown in section.

DETAILED DESCRIPTION OF THE PREFERRED EMBODIMENTS

Figure 1:
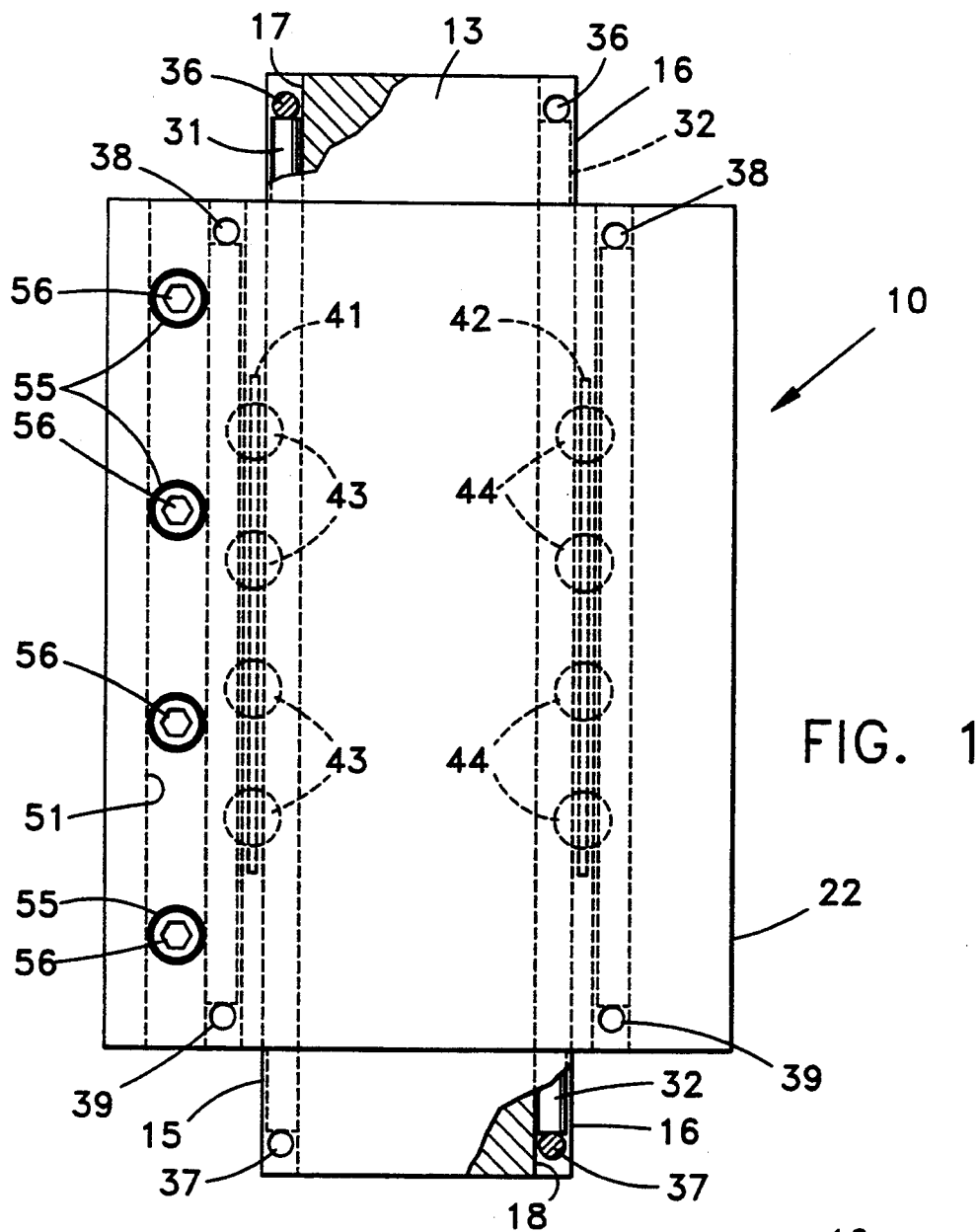

Referring now to the drawings by numerals of reference, 10 denotes generally a linear ball slide comprising the usual base or male section 12, which is rectangular in cross section. Section 12 has plane, parallel, upper and lower surfaces 13 and 14, respectively, and spaced, parallel, longitudinally extending side surfaces 15 and 16 which lie in planes that extend at right angles to the upper and lower surfaces 13 and 14 of the base 12. The side surfaces 15 and 16 of the base 12 have therein similarly shaped, and longitudinally extending grooves 17 and 18, respectively, each of which is rectangular in cross section.

Mounted for longitudinal sliding movement on base 12 is an inverted, generally U-shaped slide member 22, which has a rectangular cross sectional configuration generally similar to but larger than that of the base 12. Slide member 22 also is somewhat shorter in length than the base 12, and has formed centrally in the underside thereof a large, rectangular recess 23, which extends longitudinally of the member. Recess 23 is bound on opposite sides thereof by two, parallel leg sections or furcations 24 and 25, which extend downwardly from the bottom of recess 23 in spaced, parallel confronting relation to opposite sides of base 12.

The spaced, parallel confronting inside surfaces 26 and 27 of the slide leg sections 24 and 25 have formed therein registering, longitudinally extending, shallow grooves 28 and 29, which are rectangular in cross-section. Grooves 28 and 29 are similar in configuration and in depth as the grooves 17 and 18 in the base member 12; and when the slide member 22 is supported on the base 22 in the manner noted hereinafter, the grooves 17 and 18 in the base member 12 are disposed in spaced, confronting, registering relation with the grooves 28 and 29, respectively, in the leg sections 24 and 25.

Mounted in the grooves 17 and 18, respectively, are two, spaced, parallel, longitudinally extending bearing rods 31 and 32, respectively. Each of the rods 31 and 32 is cylindrical in configuration, and is seated in one of the corners of its associated groove 17 or 18 in a manner noted hereinafter. Similarly, mounted in each of the grooves 28 and 29, respectively, in the slide member 22 are two, spaced, parallel, longitudinally extending bearing rods 33 and 34, respectively. As in the case of rods 31 and 32, the bearing rods 33 and 34 are cylindrical in configuration, and are seated in the corners of their associated grooves 28 and 29. The rods 31 and 32 form at opposite sides of slide member 12 a pair of ball bearing races which extend longitudinally of the base member 12 between two pairs of spaced locking pins 36 and 37, which are secured in vertical bores that extend through member 12 adjacent opposite ends thereof. As shown more clearly in FIG. 1, pins 36 and 37 overlie opposite ends, respectively, of the rods 31 and 32 to prevent any axial movement of those rods relative to the base member 12.

Likewise, the bearing rods 33 and 34 form in the confronting inner surfaces 26 and 27 of the furcations 24 and 25 ball bearing races which extend longitudinally of the slide member 22 between two pairs of locking pins 38 and 39, which are secured in vertical bores formed in slide member 12 adjacent opposite ends thereof. Pins 38 and 39 extend transversely of the grooves 28 and 29, and into registry with opposite ends of rods 33 and 34 to prevent any movement thereof axially relative to slide member 22.

Figure 2:
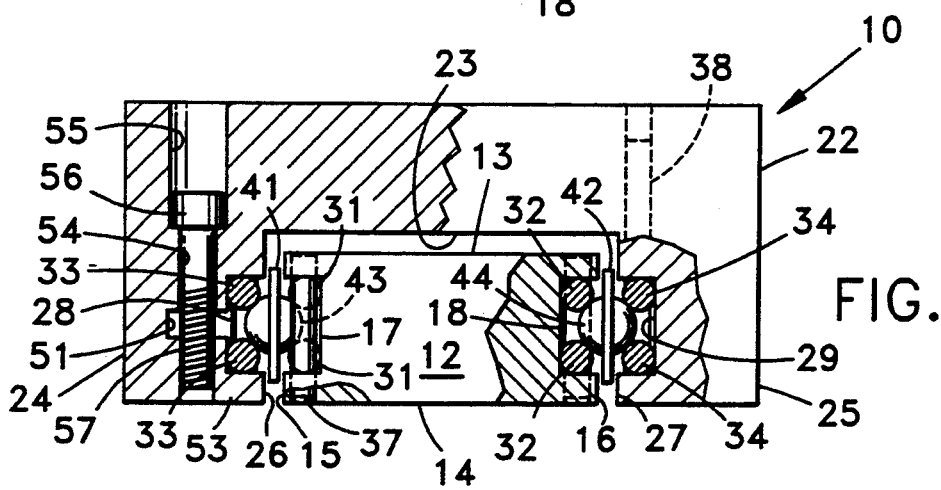

As shown more clearly in FIG. 2, the space between the inside confronting surfaces of the legs 24 and 25 of the slide member 22 is slightly greater than the width of the base member 12. This leaves between the legs 24 and 25 at opposite sides of the base member 12 two narrow spaces which are occupied by a pair of conventional, elongate ball bearing keeper plates or retainers 41 and 42, each of which has mounted therein in a conventional manner a plurality (four in the embodiment illustrated) of longitudinally spaced ball bearings 43 and 44, respectively. The ball bearings 43 have rolling engagement with the bearing rods 31 and 33, while the ball bearings 44 have rolling engagement with the bearing rods 32 and 34, thus supporting the slide member 22 in a conventional manner on the base 12 for longitudinal movement relative thereto. Moreover, the diameters of the locking pins 36–39 are such that the outer peripheral surfaces of pins 36 and 37 register approximately with opposite sides 15 and 16 of the base 12, while the peripheral surfaces of pins 38 and 39 register approximately with the inside surfaces 26 and 27 of the leg sections 24 and 25 of member 22. Portions of the lock pins 36–39 thus register with those portions of the ball bearings 43 and 44 at opposite ends of the keepers 41 and 42 which project into the grooves containing the bearing rods 31–34. Pins 38 and 39 therefore limit the axial movements of the keepers 41 and 42 in slide member 22, and pins 36 and 37 prevent removal of the keepers 41 and 42 out of opposite ends of grooves 17 and 18.

In order to provide novel means for preloading the ball bearing races defined by the bearing rods 31–34, a rather deep, elongate slot 51 is formed in the slide member 22 medially of the bottom of the groove 28 in its leg section 24. Slot 51 extends longitudinally of member 22 between opposite ends thereof, and parallel to the groove 28 and the rods 33 therein. Slot 51 has the effect of forming on the lower end of the leg section 24 a longitudinally extending lip section 53, the upper surface of which has formed on the inner end thereof (the end which confronts the base section 12) the corner portion of groove 28 which accommodates the lower bearing rod 33 of the pair thereof. In the embodiment illustrated, slide member 22 has formed adjacent one side thereof (the side containing the lip section 53) a plurality of equi-spaced vertical bores 54, which extend between the upper and lower surfaces of the slide 22, and transversely through its slot 51. Each bore 54 has in its upper end a counterbore 55; and the lower end of each bore 54—i.e., the portion thereof extending through the lip section 53—is internally threaded. Each of four socket headed screws 56 has a head section seated in one of the counterbores 55, and an externally threaded shank section 57 (FIG. 2) which is threaded into the internally threaded section of the associated bore 54 in the lip section 53.

In use, after the parts have been assembled, and in order to apply the desired preloading to the ball races defined by the bearing rods 31–34, the socket headed screws 56 are adjusted by an allen wrench in such manner as to cause the lip section 53 of the slide member 22 to be flexed slightly upwardly at its inner end (the end supporting the bearing rod 33) relative to the remainder of member 22. This movement causes the lower rod 33 (FIG. 2) to be urged slightly upwardly relative to the upper rod 33, thus reducing slightly the space between these two rods, and causing the points of contact of the rods 33 with the bearings 43 to be shifted radially further from centers of the bearings. This movement, of course, causes the ball bearings 43, the rods 31, the slide 12 and the rods 32 to be shifted slightly laterally toward the other group of ball bearings 44 and its associated bearing rods 34. This effectively preloads the ball bearing races to prevent any undesirable lateral movement of the slide member 22 relative to the base 12 during movement of the slide on the base. Thus, simply by tightening the screws 56, the preloading of the bearings can be effected very simply upon initial assembly of the slide to compensate for any manufacturing tolerances, and also to permit adjustment thereafter to compensate for wear caused by prolonged use of the slide.

From the foregoing, it will be apparent that the present invention therefore provides relatively simple and inexpensive means for quickly and accurately effecting the preloading of linear ball slides of the type described, both upon initial assembly, and thereafter if any adjustment need be made to compensate for wear. The invention considerably reduces the overall operating expense and time involved for manufacturing the novel slide, since, apart from the formation of the rectangular grooves for accommodating the usual bearing rods, the only additional machining operation required is to form the longitudinally extending slot 51 in the bottom of the bearing rod support groove in at least one of the two legs of the slide member 22 (or for that matter in each of the two legs if desired), and thereafter drilling and tapping the holes that are necessary for accommodating the adjusting screws 56.

While this invention has been illustrated and described in connection with only certain embodiments thereof, it will be apparent that it is capable of still further modification, and that this application is intended to cover any such modifications as may fall within the scope of one skilled in the art, or the appended claims.

I claims:

1. An antifriction ball slide assembly, comprising
   a pair of elongate members,
   means forming on each of said members a pair of laterally spaced, longitudinally extending, parallel ball bearing races,
   means mounting said members for longitudinal reciprocation relative to each other, and with the pair of races on one of said members confronting upon and registering with the pair of races on the other of said members, each of said races comprising a pair of spaced, parallel, longitudinally extending bearing surfaces, said mounting means including two linear sets of ball bearings each of which sets is mounted for limited reciprocation between a confronting pair of said races, and with the ball bearings of each set thereof having portions thereof projecting between and having tangential rolling engagement with each pair of spaced bearing surfaces of the associated pair of said races, and adjustable means on said one member operable selectively and positively to reduce the space separating one of said pair of spaced bearing surfaces defining one of said races on said one member, thereby to effect a corresponding preloading of said ball bearings.

2. An antifriction ball slide assembly as defined in claim 1, wherein said one member has therein an elongate slot extending between opposite ends of said one member, and opening at one side thereof on the space between said one pair of spaced bearing surfaces on said one member, said one pair of spaced bearing surfaces extending longitudinally of said one member adjacent opposite sides, respectively of said slot, and said adjustable means comprises means for selectively applying compressive forces to said one member at opposite sides of said slot, thereby slightly to close said opening at said one side of said slot, and simultaneously to reduce the space separating said one pair of spaced bearing surfaces.

3. An antifriction ball slide assembly as defined in claim 2, wherein said means for applying compressive forces to said one member comprises a plurality of screws adjustably threaded in said one member, each of said screws having a head section rotatable on said one member adjacent one side of said slot, and having an integral, reduced diameter shank section extending transversely through said slot and threading into said one member at the opposite side of said slot.

4. An antifriction ball slide assembly as defined in claim 1, wherein each of said members has therein a pair of like, laterally spaced, longitudinally extending grooves, a pair of spaced, parallel, cylindrical bearing rods are mounted in each of said grooves to extend longitudinally thereof, each of said rods forming one of said bearing surfaces for said ball bearings, and said adjustable means includes means for selectively compressing one of said grooves to reduce the space separating the pair of bearing rods in said one groove.

5. An antifriction ball slide assembly as defined in claim 4, wherein each of said grooves is generally rectangular in configuration, and the two bearing rods in each of said grooves are seated in and extend axially of the two corners of the associated rectangular groove, an elongate slot is formed in said one member centrally of the bottom of said one groove in said one member, said slot extending longitudinally of said one member between opposite ends thereof, and opening at one side thereof on said one groove, and said compressing means comprising a plurality of screws extending transversely through said slot and rotatably adjustable in said one member simultaneously to compress said slot and said one groove thereby to effect the reduction of the space separating said pair of bearing rods in said one groove.

6. An antifriction ball slide assembly, comprising a pair of elongate members, each having therein a pair of like, laterally spaced, longitudinally extending, parallel grooves, means mounting said members for longitudinal reciprocation relative to each other, and with the pair of grooves in one of said one members confronting upon and registering with the pair of grooves in the other of said members, said mounting means including a pair of spaced, parallel, cylindrical bearing rods mounted in and extending longitudinally of each of said grooves, and with the pair of bearing rods in each groove on said one member being disposed in spaced, confronting relation to the pair of rods in the confronting groove on said other member, said mounting means further including two linear sets of bearings each of which is mounted for limited reciprocation between a confronting pair of said grooves, and with the bearings of each set thereof having rolling engagement with the bearing rods in the associated pair of said grooves, and adjustable means on said one member operable selectively to bend at least a portion of said one member at one side of one of said grooves therein slightly toward the opposite side of said one groove, thereby to reduce the space between the two bearing rods in said one groove, and operatively to effect a corresponding preloading of said bearings.

7. An antifriction ball slide assembly as defined in claim 6, wherein said one member has therein an elongate slot extending between opposite ends of said one member, and opening at one side thereof on the bottom of said one groove and on the space between said two bearing rods in said one groove, and said adjustable means comprises a plurality of screws in said one member extending transversely of said slot, and rotatable selectively to bend said portion of said one member in a direction slightly to close said slot and said one groove, thereby simultaneously to reduce the space separating said two bearing rods.

* * * * *